O. EDWARDS.

SKATES.

No. 7,524. Reissued Feb. 20, 1877.

WITNESSES

Ed. A. Nottingham

A. M. Bright

INVENTOR

Oliver Edwards,

By Leggett and Leggett.

ATTORNEYS

N. PETERS, PHOTO-LITHOGRAPHER, WASHINGTON, D. C.

UNITED STATES PATENT OFFICE.

OLIVER EDWARDS, OF FLORENCE, MASSACHUSETTS.

IMPROVEMENT IN SKATES.

Specification forming part of Letters Patent No. 154,176, dated August 18, 1874; reissued No. 6,410, dated May 4, 1875; reissue No. 7,524, dated February 20, 1877; application filed November 14, 1876.

*To all whom it may concern:*

Be it known that I, OLIVER EDWARDS, of Florence, in the county of Hampshire and State of Massachusetts, have invented certain new and useful Improvements in Skates; and I do hereby declare the following to be a full, clear, and exact description of the invention, such as will enable others skilled in the art to which it pertains to make and use it, reference being had to the accompanying drawings, which form part of this specification.

The object of this invention is to produce a cheap, durable, and simple skate; and it consists, first, in the standard of a skate cast with lateral projections and a central rivet; second, in the combination, with metallic foot or heel plates, of a supporting-standard, formed with segmental brackets, and a concentric plate-engaging device; third, in the runner of a skate, whose sole and heel standards have their respective plate-connecting rivets provided with enlarged bases, and made of the same piece with the runner; fourth, in a skate-heel standard, having its plate-engaging mechanism constructed with lateral projections, and formed in the same metallic piece with the button which secures the heel of the skater to its plate; fifth, in the runner of a skate, having a widened tread, and constructed with plate supporting and connecting mechanism, all made in the same metallic piece; sixth, in a skate-runner, having its bottom constructed with a laterally-projecting rib, and its standards provided with plate-supporting brackets, all made in a single piece of metal; seventh, in the combination, with a foot or heel bearing plate, of a supporting-standard, having segmental brackets formed in the same piece therewith, and vertically supporting the plate on either transverse side of the standard.

Figure 1:
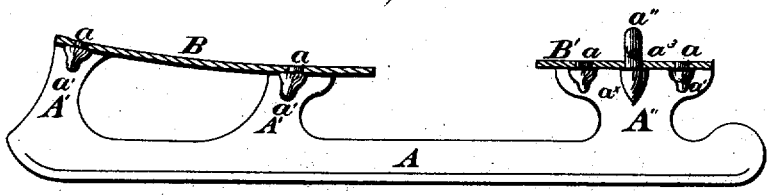
Figure 2:
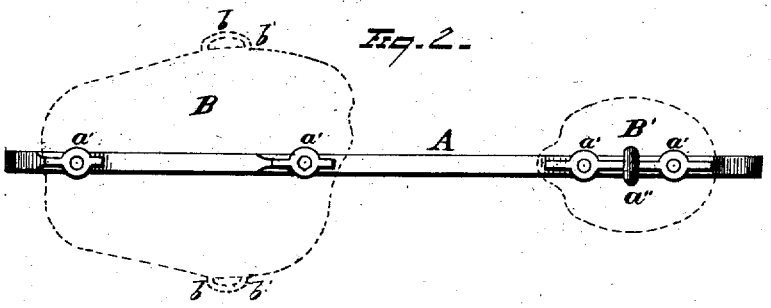

In the drawings, Figure 1 represents a side view of the skate, with the heel and foot plates in section; Fig. 2, a top view of the same; and Fig. 3, a rear upright sectional view through the button or stud that attaches the heel-plate to the heel of the boot or shoe.

A represents the runner of the skate of the usual form, with the risers or standards A′, A′, and A″, with the rivets to secure the foot and heel plates to the runner, and the button or stud to fasten the heel of the skate to the heel of the boot, all in the same piece of metal. A′ A′ are the forward and center risers or standards. A″ is the rear standard that supports the heel-plate. *a a a a* are rivets projecting upwardly from the top of the standards, and by which the foot and heel plates are firmly secured to the standards of the runner. *a′ a′ a′ a′* are bases to the rivets *a*, and are concentric with the rivets on each side of and at the top of the standards, which give lateral support to the foot and heel plates, when they are riveted down upon the risers. *a″* is the button or stud, which, like the rivets *a*, has a base, $a^{\times}$, on each side of the riser, and passes through the heel-plate, above which is a neck, $a^3$, to receive the plate fast to the heel of the boot, while the button on the top is of greater diameter, transversely with the riser, than parallel with the runner, the neck $a^3$ being round.

At the lower edge of the runner, and on either side, are projections *d d*, which give to the face of the runner a wide tread and a thinner and lighter body; hence, a lighter skate is produced with the requisite strength.

The runner A, with the risers, rivets, button, and their bases, is made by casting in molds from any suitable metal, of which the runners of skates are cast, or the runners may be cut or stamped from metal plates, and then formed in suitable dies to the condition described, and all in one piece of metal.

Figure 3:
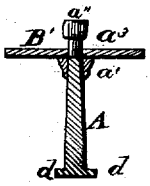

B is the toe or ball of the foot plate or rest, riveted fast to risers A′ by the rivets *a*. B′ is the heel-plate rest, riveted fast to riser A″ by rivets *a*, with a hole to allow the button *a″* to pass through it, as seen in Figs. 1 and 3. *b b* are projections on either side of plate B, and have loop-holes *b′* thereon to receive the proper straps to fasten the foot to the skate.

By this construction a skate is made, and has but three pieces of metal in it, and by having less pieces and fewer joints the strength and durability of a skate is increased, while the liability to break or get out of order is decreased, and cost of production lessened.

Having fully described my invention, what I claim as new, and desire to secure by Letters Patent, is—

1. The standard of a skate, cast with lateral projections and a central rivet, substantially as described.

2. In a skate, the combination, with a foot or heel bearing plate, of a supporting-standard, having segmental brackets formed in the same piece therewith, and vertically supporting the plate on either transverse side of the standard, substantially as and for the purpose described.

3. In a skate, the combination, with metallic foot or heel plates, of a standard, the latter having plate-supporting brackets and a plate-engaging device formed in the same piece therewith, substantially as and for the purpose described.

4. The combination, with the foot or heel plates, of a skate-standard, which latter has lateral supporting-brakets and a central plate-engaging device, all formed in a single piece, substantially as and for the purpose described.

5. The runner of a skate, whose sole and heel standards have their respective plate-connecting rivets provided with enlarged bases, and made of the same piece with the runner, substantially as described.

6. A skate-heel standard, having its plate-engaging mechanism constructed with lateral projections, and formed in the same metallic piece with the button, which secures the heel of the skater to its plate, substantially as and for the purpose described.

7. The runner of a skate having a widened tread, and constructed with plate-supporting and connecting mechanism, all made in the same metallic piece, substantially as and for the purpose described.

8. A skate-runner, having its bottom constructed with a laterally-projecting rib, and its standards provided with plate-supporting brackets, all made in a single piece of metal, substantially as and for the purpose described.

In testimony that I claim the foregoing I have hereunto set my hand this 10th day of November, 1876.

OLIVER EDWARDS.

Witnesses:
H. P. DIBBLE,
L. M. LAYTON.